United States Patent
Tsuboki et al.

(10) Patent No.: US 7,890,717 B2
(45) Date of Patent: *Feb. 15, 2011

(54) STORAGE SYSTEM, DATA TRANSFER METHOD, AND PROGRAM

(75) Inventors: Masanao Tsuboki, Oiso (JP); Ryusuke Ito, Odawara (JP); Mitsuru Kashiwagi, Yugawara (JP)

(73) Assignee: Hitachi, Ltd., Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 12/222,226

(22) Filed: Aug. 5, 2008

(65) Prior Publication Data

US 2008/0320220 A1 Dec. 25, 2008

Related U.S. Application Data

(63) Continuation of application No. 11/246,224, filed on Oct. 11, 2005, now Pat. No. 7,424,583.

(30) Foreign Application Priority Data

Aug. 31, 2005 (JP) .............................. 2005-252224

(51) Int. Cl.
*G06F 12/00* (2006.01)
(52) U.S. Cl. ....................... 711/162; 711/114
(58) Field of Classification Search ................. 711/162, 711/114

See application file for complete search history.

(56) References Cited

U.S. PATENT DOCUMENTS

| | | | | |
|---|---|---|---|---|
| 6,463,513 | B1 * | 10/2002 | Bish et al. .................... | 711/161 |
| 7,263,590 | B1 * | 8/2007 | Todd et al. ................... | 711/165 |
| 2001/0054133 | A1 * | 12/2001 | Murotani et al. ............. | 711/114 |
| 2003/0005243 | A1 * | 1/2003 | Zakai et al. .................. | 711/159 |
| 2003/0200487 | A1 * | 10/2003 | Taninaka et al. .............. | 714/42 |

FOREIGN PATENT DOCUMENTS

| JP | 2003-6016 | 6/2001 |
|---|---|---|
| JP | 2003-6016 | * 1/2003 |
| JP | 2005-108133 | 10/2003 |

* cited by examiner

*Primary Examiner*—Hashem Farrokh
(74) *Attorney, Agent, or Firm*—Foley & Lardner LLP

(57) ABSTRACT

A storage system including: a first disk array apparatus for providing first volumes for storing data sent from a host system; a second disk array apparatus for providing second volumes for storing back-up data of the first volumes; and a console terminal for operating the first disk array apparatus. The console terminal is equipped with a setting unit for setting a priority for each first volume in accordance with an external command. The first disk array apparatus is equipped with: a storage unit for storing the priorities set by the priority setting unit; and a transfer unit for reading the priorities from the storage unit upon receiving the data and transferring the data stored in the first volumes to the second volumes of the second disk array apparatus in order of descending priority of the first volumes that store the data.

3 Claims, 12 Drawing Sheets

FIG.5

| VOLUME NUMBER 71 | VOLUME SIZE 72 | VOLUME USE SIZE 73 | EMULATION TYPE 74 | CREATION DATE AND TIME 75 | LAST UPDATE DATE AND TIME 76 | DUPLICATE LOGICAL VOLUME 77 | VOLUME PRIORITY 78 | ACCESS FREQUENCY 79 |
|---|---|---|---|---|---|---|---|---|
| 00:00 | 500MB | 410MB | MF | 2005/08/01 21:40:50 | 2005/08/18 09:30:21 | 00:05 | 60 | 9 |
| 00:01 | 300MB | 25MB | OPEN-V | 2005/07/10 10:06:02 | 2005/08/18 18:29:55 | 00:59 | 85 | 35 |
| 00:02 | 33MB | 1MB | OPEN-3 | 2005/08/10 04:30:50 | 2005/08/10 04:30:50 | 01:24 | 20 | 0 |
| --- | --- | --- | --- | --- | --- | --- | --- | --- |
| 00:31 | 500MB | 300MB | OPEN-V | 2005/08/15 22:00:01 | 2005/08/15 17:30:52 | 00:46 | 70 | 20 |
| --- | --- | --- | --- | --- | --- | --- | --- | --- |

FIG.7

| TAG NAME (91) | LAST UPDATE DATE AND TIME SETTING (92) | VOLUME NUMBER SETTING (93) | VOLUME SIZE SETTING (94) | EMULATION TYPE SETTING (95) | OPMF VOLUME SETTING (96) | PARTNER APPARATUS PRODUCTION NUMBER SETTING (97) | VOLUME PRIORITY SETTING (98) | VOLUME ACCESS FREQUENCY SETTING (99) | SETTING VALIDATION OR NULLIFICATION (101) |
|---|---|---|---|---|---|---|---|---|---|
| SETTING 1 | | 00:00~04:FF | ~1GB | | 1 | | | | 1 |
| SETTING 2 | | | | 2 | | | | 10~50 | 1 |
| SETTING 3 | 2005/08/10 ~2005/08/15 | | | | | | 50~100 | | 1 |
| ---- | ---- | ---- | ---- | ---- | ---- | ---- | ---- | ---- | ---- |

| REGISTRATION NUMBER | VOLUME NUMBER | VOLUME PRIORITY | TRANSFER STANDBY TIME |
|---|---|---|---|
| 1 | 00:15 | 95 | 00:00:02 |
| 2 | 02:41 | 80 | 00:00:05 |
| 3 | 00:31 | 70 | 00:00:14 |
| 4 | 03:41 | 69 | 00:00:19 |
| ⋮ | ⋮ | ⋮ | ⋮ |
| 10 | 04:F2 | 30 | 00:01:12 |
| ⋮ | ⋮ | ⋮ | ⋮ |

| ACCESS FREQUENCY | PRIORITY |
|---|---|
| 0 | −3 |
| 1 TO 5 | −1 |
| 6 TO 10 | ±0 |
| 11 TO 15 | +1 |
| 16 TO 20 | +3 |
| MORE THAN 20 | +5 |

STORAGE SYSTEM, DATA TRANSFER METHOD, AND PROGRAM

CROSS-REFERENCES TO RELATED APPLICATIONS

This application is a Continuation of nonprovisional U.S. application Ser. No. 11/246,224 filed on Oct. 11, 2005 now U.S. Pat. No. 7,424,583. Priority is claimed based on U.S. application Ser. No. 11/246,224 filed on Oct. 11, 2005, which claims the priority of Japanese Application 2005-252224 filed on Aug. 31, 2005, all of which is incorporated by reference.

BACKGROUND OF THE INVENTION

The present invention relates to a storage system, a data transfer method, and a storage medium, and is preferably applied to, for example, a storage system that transfers data between disk array apparatuses.

Conventionally, a widely known storage system includes disk array apparatuses that have physical storage areas such as hard disks to store volumes that are logical storage area units, wherein the disk array apparatuses have a duplicating function to transfer data between them and copy data.

When such a storage system receives an instruction to back up a backup target (a file or similar) and if the attributes of the backup target and a method for managing duplicated data obtained by the backing-up of the backup target are designated, Japanese Patent Laid-Open (Kokai) Publication No. 2005-108133, for example, suggests a method for managing the designated attributes and the like by associating the designated attributes with the duplicated data and volume names to store the duplicated data.

As a means of disaster recovery for the storage system, data from a first disk array apparatus operated at a certain site (or terminal) is transferred to and backed up at a second disk array apparatus set up at a remote site (hereinafter referred to as "remote copy").

However, if the remote copy is executed by this storage system, data is transferred from the first disk array apparatus to the second disk array apparatus in the order of the data written in volumes of the first disk array apparatus. Accordingly, there is a problem in that backup of important data may be left until later.

Moreover, in order to transfer all the data from the first disk array apparatus and back it up at the second disk array apparatus, the amount of data transferred increases. As a result, there is the problem of increasing copy time.

SUMMARY OF THE INVENTION

The present invention has been made in consideration of the above conventional art problems. This invention aims to provide a storage system, a data transfer method, and a storage medium that minimize the data transfer amount, decrease copy time, and ensure a highly-reliable data backup.

In order to achieve the above-described object, this invention provides a storage system including: a first disk array apparatus for providing first volumes for storing data sent from a host system; a second disk array apparatus for providing second volumes for storing back-up data of the first volumes; and a console terminal for operating the first disk array apparatus; wherein the console terminal includes a setting unit for setting a priority for each first volume in accordance with an external command; and wherein the first disk array apparatus includes: a storage unit for storing the priorities set by the priority setting unit; and a transfer unit for reading the priorities from the storage unit upon receiving the data, and transferring the data stored in the first volumes to the second volumes of the second disk array apparatus in order of descending priority of the first volumes that store the data.

Accordingly, data stored in the high-priority first volume can be transferred first irrespective of the order in which data were stored in the first volumes. Therefore, for the backup of important data as well, the data can be transferred to a corresponding second volume of the second disk array apparatus immediately without being left until later.

Moreover, this invention provides a data transfer method for a storage system including: a first disk array apparatus for providing first volumes for storing data sent from a host system; a second disk array apparatus for providing second volumes for storing back-up data of the first volumes; and a console terminal for operating the first disk array apparatus; wherein the data transfer method includes: a first step of setting a priority for each first volume in accordance with an external command; a second step of storing, in a storage unit, the priorities set in the first step; and a third step of reading the priorities from the storage unit upon receiving the data, and transferring the data stored in the first volumes to the second volumes of the second disk array apparatus in order of descending priority of the first volumes that store the data.

Accordingly, data stored in the high-priority first volume can be transferred first irrespective of the order in which data were stored in the first volumes. Therefore, for the backup of important data as well, the data can be transferred to a corresponding second volume of the second disk array apparatus immediately without being left until later.

Furthermore, this invention provides a storage medium for storing a program for a storage system. The storage system includes: a first disk array apparatus for providing first volumes for storing data sent from a host system; a second disk array apparatus for providing second volumes for storing back-up data of the first volumes; and a console terminal for operating the first disk array apparatus. The program causes the storage system to execute: a first step of storing, in a storage unit, a priority set for each first volume in accordance with an external command; and a second step of reading the priorities from the storage unit upon receiving the data, and transferring the data stored in the first volumes to the second volumes of the second disk array apparatus in order of descending priority of the first volumes that store the data.

Accordingly, data stored in the high-priority first volume can be transferred first irrespective of the order in which data were stored in the first volumes. Therefore, for the backup of important data as well, the data can be transferred to a corresponding second volume of the second disk array apparatus immediately without being left until later.

According to this invention, the priority for each first volume is set in accordance with an external command, and the priorities of the first volumes are stored in the storage unit; and when the data is received, the priorities are read from the storage unit, and the data stored in the first volume is then transferred to the second volume of the second disk array apparatus in order of descending priority of the first volumes storing the data. Consequently, data stored in the first volume with a high priority can be transferred first irrespective of the order in which the data was stored in the first volume. Therefore, for the backup of important data as well, the data can be transferred to the corresponding second volume of the second disk array apparatus without being left until later. It is thus possible to realize a storage system, data transfer method and storage medium that ensure highly-reliable data backup.

BRIEF DESCRIPTION OF THE DRAWINGS

FIG. 5 is a conceptual diagram explaining a volume information storage table.

FIG. 7 is a conceptual diagram explaining a transfer volume information setting storage table.

FIG. 8 is a conceptual diagram explaining a transfer standby table.

FIG. 12 is a conceptual diagram explaining a volume priority automatic change table.

DETAILED DESCRIPTION OF THE INVENTION

An embodiment of this invention is described below in detail with reference to the attached drawings.

(1) Configuration of Storage System According to this Embodiment

Figure 1:
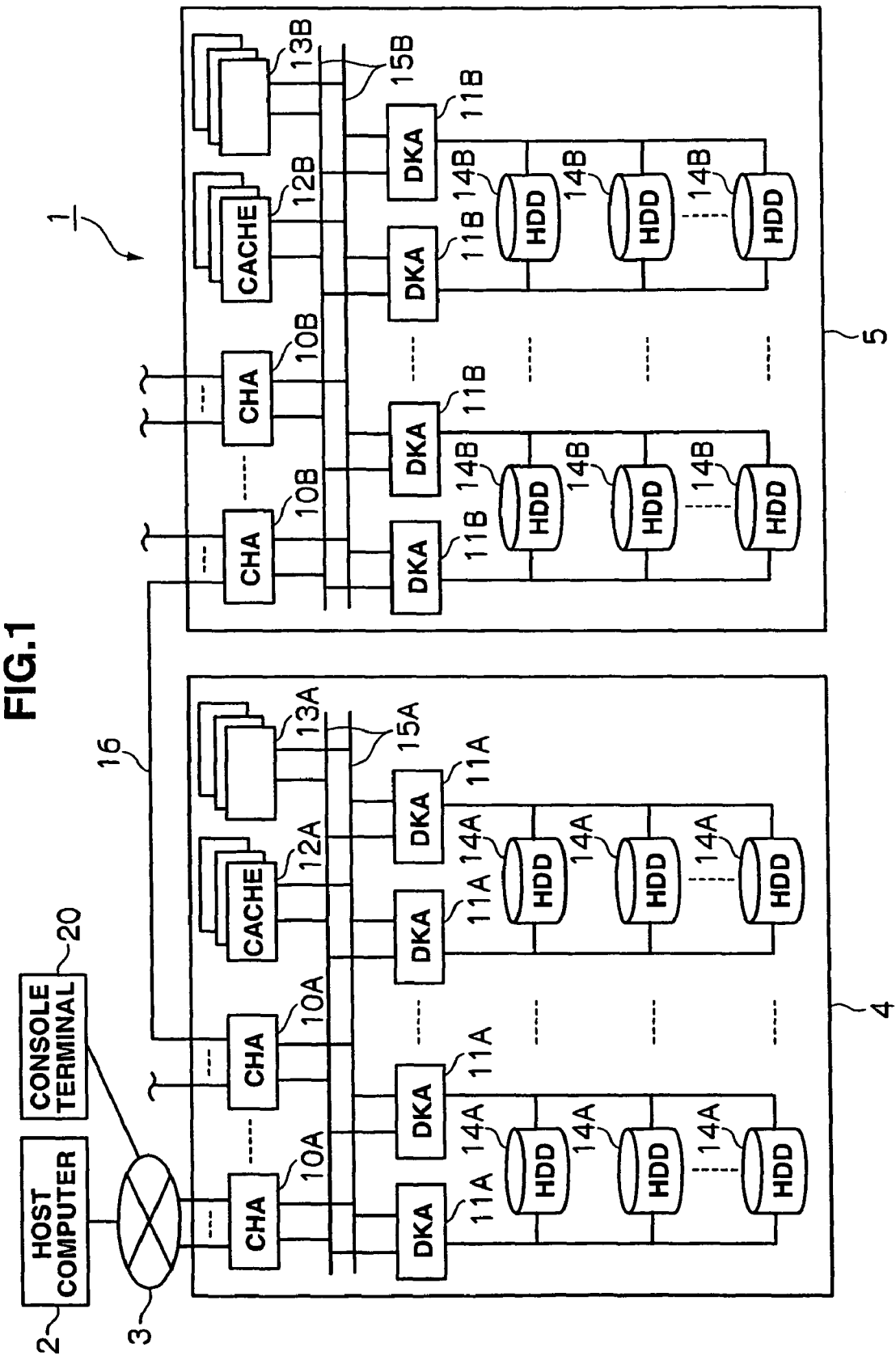
FIG. 1 is a block diagram of the configuration of a storage system according to an embodiment of this invention.

FIG. 1 shows a storage system 1 according to this embodiment. In the storage system 1, a host computer 2 and a console terminal 20 described later are connected via a network 3 to a first disk array apparatus 4, which is also connected to a second disk array apparatus 5 for data backup.

The host computer 2 is a computer equipped with a CPU (Central Processing Unit) (not shown) and memory. The CPU of the host computer 2 executes various programs, thereby realizing a variety of functions. The host computer 2 is, for example, a personal computer, a workstation, or a mainframe.

The host computer 2 can perform data input to or output from the first disk array apparatus 4 via the network 3. Examples of the network 3 include a LAN (Local Area Network), a SAN (Storage Area Network), the Internet, private lines, or public lines, which can be selected and used as appropriate. If the network 3 is a SAN, communication between the host computer 2 and the first disk array apparatus 1 via the network 3 is conducted according to Fibre Channel Protocol. If the network 3 is a LAN, communication between the host computer 2 and the first disk array apparatus 1 via the network 3 is conducted according to TCP/IP (Transmission Control Protocol/Internet Protocol).

The first disk array apparatus 4 includes a plurality of channel adapters 10A, a plurality of disk adapters 11A, cache memory 12A, shared memory 13A, and a plurality of storage devices 14A.

Each channel adapter 10A has a transmitter-receiver function that sends and receives, for example, data and various commands to and from external devices connected to the first disk array apparatus 4 (such as the host computer 2, the second disk array apparatus 5, and the console terminal 20), and also has a communication port. Each channel adapter 10A is configured as a microcomputer system equipped with, for example, a microprocessor (MP) and internal memory. The channel adapters 10A interpret and execute various kinds of commands sent from the external devices. The respective communication ports on the channel adapters 10A are given network addresses such as an Internet Protocol (IP) address or a World Wide Name (WWN) to identify themselves. Accordingly, each channel adapter 10A can individually act as NAS (Network Attached Storage). Each channel adapter 10A can perform various kinds of processing by executing a control program stored in the internal memory, thereby performing the backup processing and restoration processing described later.

The disk adapters 11A are used to send and receive data to and from the storage devices 14A. For redundancy purposes, two disk adapters 11A constitute a pair and are connected to the same storage devices 14A. Each disk adapter 11A is configured as a microcomputer system equipped with a CPU and memory.

Each disk adapter 11A performs processing to write and read data to and from the storage devices 14A in accordance with instructions from the channel adapters 10A. When inputting or outputting data to or from the storage devices 14A, each disk adapter 11A converts a logical address designated by the host computer 2 to a physical address. When the storage devices 14A are managed according to the RAID system, each disk adapter 11A makes data access according to the RAID configuration.

The cache memory 12A temporarily stores data received from the host computer 2 and read from the storage devices 14A. The shared memory 13A stores, for example, control information for controlling the operation of the first disk array apparatus 4.

The channel adapters 10A, the disk adapters 11A, the cache memory 12A, and the shared memory 13A are mutually connected via a LAN 15A. Necessary commands and data are sent and received through this LAN 15A.

Each storage device 14A is composed of, for example, an expensive disk drive such as a SCSI (Small Computer System Interface) disk, or an inexpensive disk drive such as a SATA (Serial AT Attachment) disk or an optical disk. One or more logical volumes (hereinafter referred to as the "logical volumes") are set in physical storage areas provided by one or more disk devices. These logical volumes store data.

The second disk array apparatus 5 is configured in the same manner as the first disk array apparatus 1, except that inexpensive disk devices such as SATA disks or optical disks are used as storage devices 14B. Instead of the letter "A" as used in FIG. 1, the letter "B" has been added to the same reference numerals used for the first disk array apparatus 4, and the reference numerals with the letter "B" indicate the same parts in the second disk array apparatus 5 as the components of the first disk array apparatus 4. The second disk array apparatus 5 is connected via a signal line 16 such as a cable or a LAN to the first disk array apparatus 4 and is capable of sending or receiving necessary commands and data to or from the first disk array apparatus 4 via this signal line 16.

In the second disk array apparatus 5 as well, one or more logical volumes are set on physical storage areas provided by the storage devices 14B in the second disk array apparatus 5. Various kinds of data including backup data for the first disk array apparatus 4 are stored in these logical volumes, as is described later.

The flow of data input/output between the host computer 2 and the first disk array apparatus 4 in the storage system 1 is described below. When a user enters a command to write data to a logical volume in the first disk array apparatus 4, the host computer 2 sends a corresponding data write request and the write data to a specified channel adapter 10A of the first disk array apparatus 4.

The channel adapter 10A, having received the data write request, writes the write command to the shared memory 13 and the write data to the cache memory 12A. Now, the disk adapter 11A is always monitoring the shared memory 13A. Once the disk adapter 11A detects that the write command has been written to the shared memory 13, it converts the data write request by logical address designation into a data write request by physical address designation. The disk adapter 10A also reads out the write data from the cache memory 12A and sends it to the corresponding address position in the relevant storage device 14A.

In contrast, when the user enters a command to read data stored in a specified logical volume in the first disk array apparatus 4, the host computer 2 sends the corresponding data read request to a specified channel adapter 10A in the first disk array apparatus 4.

The channel adapter 10A, having received this data read request, writes the read command to the shared memory 12A. Upon detecting that the read command has been written to the shared memory 12A, the disk adapter 11A converts the data read request by logical address designation into a data read request by physical address designation and, according to this address, causes the designated data to be read from the corresponding address position of the relevant storage device 14A.

The disk adapter 35 writes the data read from the storage device 14A to the cache memory 12A and writes the read command to the shared memory 13A. Now, the channel adapter 10A is always monitoring the shared memory 13A, and once the channel adapter 10A detects that the read command has been written to the shared memory 13A, it reads the corresponding data from the cache memory 12A according to the read command and sends the obtained data via the network 3 to the corresponding host computer 2.

Figure 2:
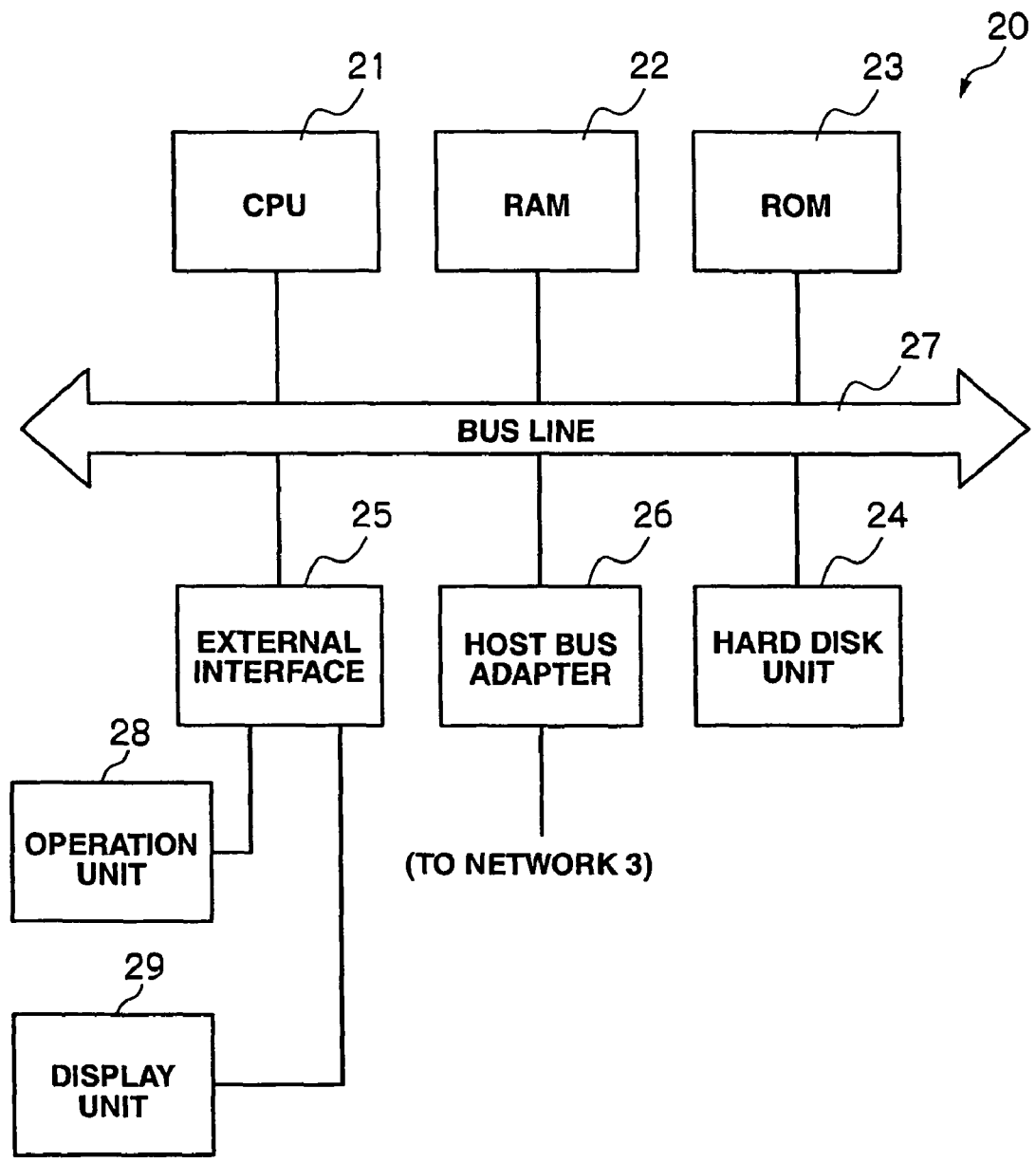
FIG. 2 is a block diagram of the configuration of a console terminal.

The console terminal 20 according to this embodiment is described below. FIG. 2 shows the specific configuration of the console terminal 20. The console terminal 20 is configured by connecting, via a bus line 27, a CPU 21, a ROM (Read Only Memory) 22 that stores various kinds of programs, a RAM (Random Access Memory) 23 as a work memory for the CPU 21, a hard disk unit 24, an external interface unit 25, and a host bust adapter 26. The external interface unit 25 is also connected to an operation unit 28 composed of, for example, a keyboard and a pointing device, and to a display unit 29.

The CPU 21 loads, to the RAM 22, various kinds of application software and an operating system stored in the ROM 23 and the hard disk unit 24, and various control programs including those for controlling a volume information display window 40 and transfer volume information setting window 50 described later.

By running the applications, the operating system, and the various control programs loaded to the RAM 22, the CPU 21 can perform various kinds of processing on the console terminal 20. Specifically speaking, the CPU 21 can, for example, read a volume information storage table 70 and a transfer volume information setting storage table 90 (described later in detail), from the first disk array apparatus 4 in accordance with operation of the console terminal 28 by a user, update the volume information storage table 70 and the transfer volume information setting storage table 90, and send them to the first disk array apparatus 4.

Moreover, the CPU 21 can make various graphical user interfaces (GUIs), including the volume information display window 40 and the transfer volume information setting window 50 (described later in detail), be displayed on the display unit 29 according to various programs, the volume information storage table 70, and the transfer volume information setting storage table 90.

(1-2) Backup Processing

Now, backup processing of the storage system 1 will be described with reference to FIGS. 3 to 12. The storage system 1 according to this embodiment is characterized in that the volume priority for each logical volume of the first disk array apparatus 4 is set by a user, and data written to a logical volume with a high volume priority is transferred first to the corresponding logical volume of the second disk array apparatus 5, irrespective of the order in which data was written to the logical volumes.

The storage system 1 according to this embodiment is also characterized in that a logical volume whose data should be transferred to the second disk array apparatus 5 is set by the user, and only data written to the logical volume to which settings were made is transferred to the corresponding logical volume of the second disk array apparatus 5.

Figure 3:
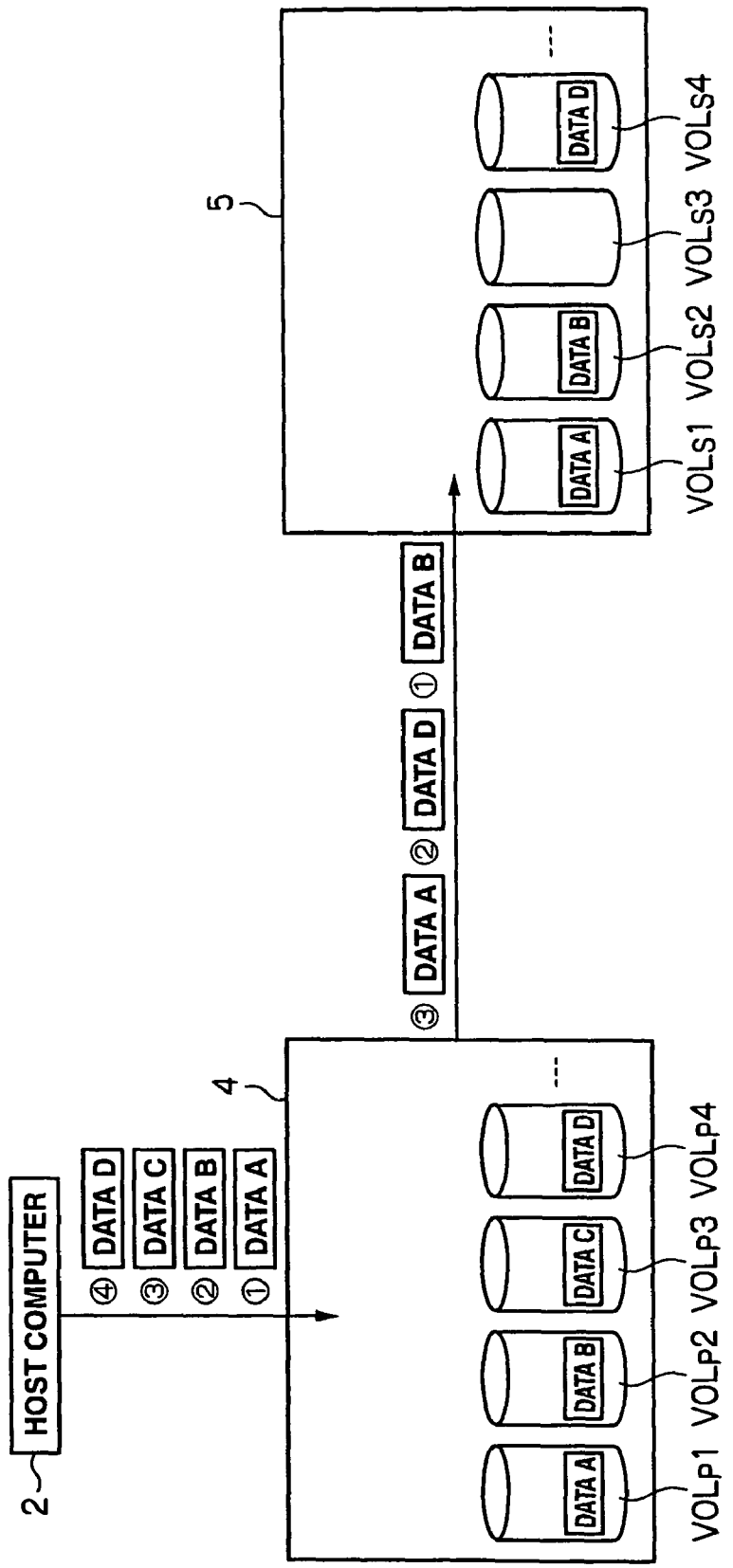
FIG. 3 is a conceptual diagram explaining data transfer processing.

FIG. 3 is a conceptual diagram schematically illustrating the content of the backup processing. Logical volumes of the first disk array apparatus 4 to and from which data is input or output are hereinafter referred to as "original logical volumes $VOL_P$" (FIG. 3), while logical volumes of the second disk array apparatus 5 which are used for backup purposes are hereinafter referred to as "duplicate logical volumes $VOL_S$" (FIG. 3).

When the channel adapter 10A of the first disk array apparatus 4 (hereinafter referred to as "original channel adapter") receives write data in the order of data A, data B, data C, and data D, it first stores data A in the original logical volume $VOL_P1$, then data B in the original logical volume $VOL_P2$, followed by data C in the original logical volume $VOL_P3$, and finally data D in the original logical volume $VOL_P4$, in accordance with the relevant data write request.

If the volume priorities of the original logical volumes $VOL_P1$ to $VOL_P4$ are set in descending order from the original logical volume $VOL_P2$, to the original logical volume $VOL_P4$, and then to the original logical volume $VOL_P1$, the original channel adapter 10A transfers the data in the order of data B, data D, and data A to the second disk array apparatus 5, and first stores data B in the duplicate logical volume $VOL_S2$ corresponding to the original logical volume $VOL_P2$, then stores data D in the duplicate logical volume $VOL_S4$ corresponding to the original logical volume $VOL_P4$, and finally stores data A in the duplicate logical volume $VOL_S1$ corresponding to the original logical volume $VOL_P1$.

Moreover, if the original logical volume $VOL_P3$, for example, is not a logical volume set by the user, the original channel adapter 10A is designed to not transfer data C written in the original logical volume $VOL_P3$ to the second disk array apparatus 5.

Now, the backup processing according to this embodiment will be described in detail below.

(1-2-1) Volume Priority Setting Processing

First, the volume priority setting processing according to this embodiment will be described. When a user operates the console terminal 28 to set the volume priority of, for example, the original logical volume $VOL_P$ with volume number "00: 31," the CPU 21 of the console terminal 20 reads the volume information storage table 70 stored in the storage device 14A of the first disk array apparatus 4 in accordance with a control program of the volume information display window 40, and makes the display unit 29 display the volume information display window 40 shown in FIG. 4.

This volume information display window 40 displays volume information 41 such as a volume number, a volume size, a volume use size, emulation type, creation date and time, last update date and time, and corresponding duplicate logical volume $VOL_S$. The "emulation" means to run software, which was developed and designed for use on a certain type of hardware, on another hardware of a different design. In this case, the emulation type "OPEN-V" in FIG. 4 means to run "OPEN-V" type software on the first disk array apparatus 4 and store "OPEN-V" type data.

This volume information display window 40 also includes a volume priority setting field 42. The user can set a desired volume priority by operating the operating unit 28.

On the other hand, FIG. 5 shows the volume information storage table 70 that, corresponding to the volume information display window 40, includes a volume number storage field 71, a volume size storage field 72, a volume use size storage field 73, an emulation type storage field 74, a creation date and time storage field 75, a last update date and time storage field 76, and a duplicate volume storage field 77 for the corresponding duplicate logical volume $VOL_S$. This volume information storage table 70 also includes a volume priority storage field 78 and an access frequency storage field 79.

Figure 4:
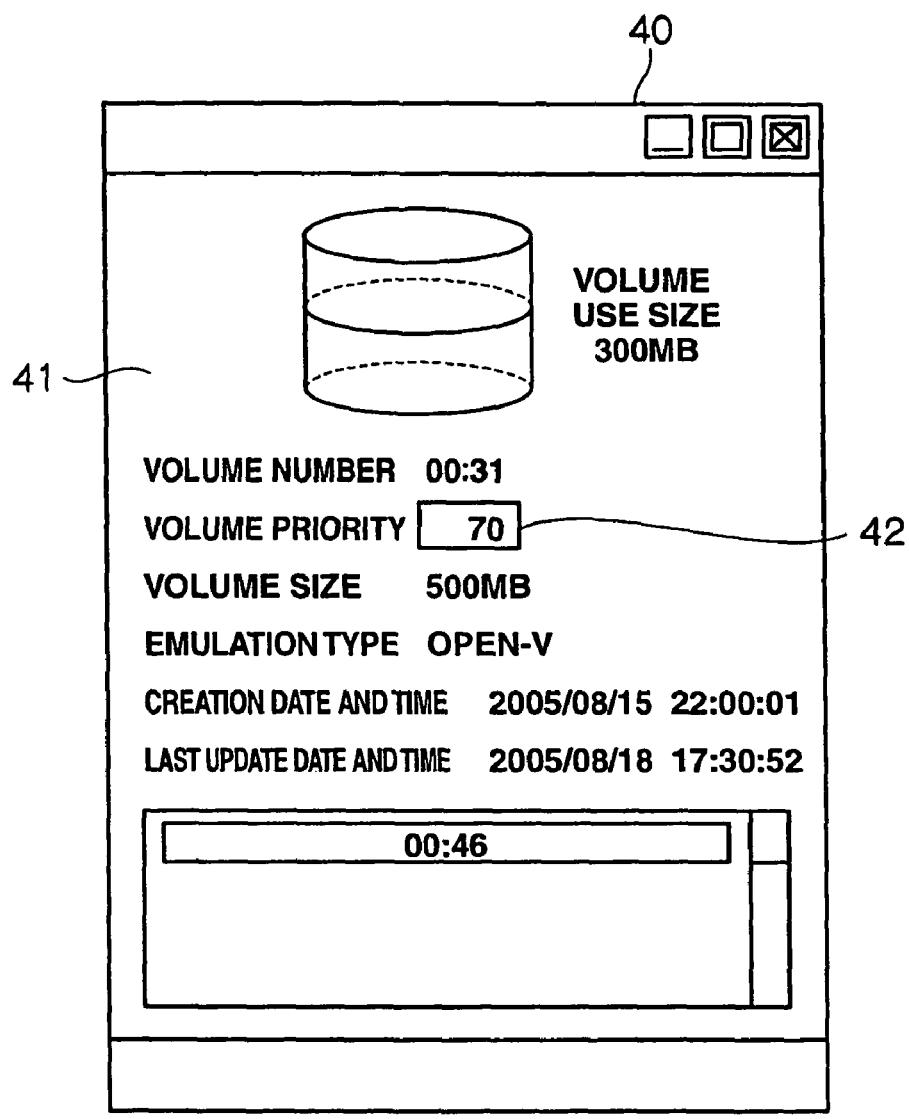
FIG. 4 is a conceptual diagram explaining a volume information display window.

If the user enters "70" in the volume priority setting field 42 of the volume information display window 40 as shown in FIG. 4, the priority in the priority storage field 78 of the volume information storage table 70 shown in FIG. 5 will be changed to "70" for the volume number "00:31" in the volume number storage field 71.

The CPU 21 then sends the changed volume information storage table 70 to the first disk array apparatus 4 and updates the volume information storage table 70 of the first disk array apparatus 4.

As described above, this storage system 1 is designed to enable setting of the volume priority of each original logical volume $VOL_P$ of the first disk array apparatus 4 as desired by the user.

If the volume priority is "100," when data is written to the original logical volume $VOL_P$, the storage system 1 is designed to instantly transfer the data to the corresponding duplicate logical volume $VOL_S$ of the second disk array apparatus 5. On the other hand, if the volume priority is "0," the storage system 1 is designed to not transfer the data to the corresponding duplicate logical volume $VOL_S$ of the second disk array apparatus 5. Also, in this storage system 1, all the volume priorities of the original logical volumes $VOL_P$ are initially set to "50."

Moreover, since the volume information display window 40 is displayed on the display unit 29 in the storage system 1, the user can be aware of the volume information 41 while setting the volume priorities of the original logical volumes $VOL_P$ as described above. Accordingly, in the storage system 1, the volume priorities of the original logical volumes $VOL_P$ can be easily set.

This embodiment describes the case where the volume information display window 40 is displayed on the display unit 29 so that the user can be aware of the volume information while setting the volume priorities of the original logical volumes $VOL_P$. However, the volume priorities may be set while a list of volume numbers and volume priorities are displayed. Other various display forms can also be applied.

(1-2-2) Transfer Volume Information Setting Processing

The transfer volume information setting processing according to this embodiment is described below. When the user operates the operation unit 28 to set the original logical volume $VOL_P$, from which data should be transferred to the second disk array apparatus 5, the CPU 21, in accordance with a control program of the transfer volume information setting window 50, reads the transfer volume information setting storage table 90 stored in the storage device 14A of the first disk array apparatus 4 and makes the transfer volume information setting window 50 of FIG. 6 be displayed on the display unit 29.

This transfer volume information setting window 50 includes, for example, a last update date and time setting field 51, a volume number setting field 52, a volume size setting field 53, an emulation type setting field 54, an OP/MF volume setting field 55, a partner apparatus production number setting field 56, a volume priority setting field 57, and a volume access frequency setting field 58. In the transfer volume information setting window 50, check boxes 59 are provided for setting the respective fields 51 to 58.

This transfer volume information setting window 50 also includes a setting validation/nullification setting field 60 for selecting either setting validation or setting nullification, a finalize-setting button 61 for reflecting the above-described settings, a clear-setting button 62 for clearing the above-described settings, and a relevant logical volume display field 63 for displaying the original logical volumes which fit the conditions of the above-described settings.

Furthermore, the transfer volume information setting window 50 has transfer volume information setting switching tags 64 so that a plurality of settings can be made to the original logical volumes $VOL_P$ from which data should be transferred.

With this transfer volume information setting window 50, when a user operates the operation unit 28 to mark the relevant check boxes 59 of the setting fields 51 to 58 that the user wants to set, enter numerical values in the setting fields 51 to 58, check the setting validation in the setting validation/nullification field 60, and press the finalize-setting button 61, the settings content will be reflected and the original volume VOLP that matches the description of the above-described settings will be displayed in the relevant logical volume display field 63.

On the other hand, FIG. 7 shows the transfer volume information setting storage table 90. This transfer volume information setting storage table 90 includes, for each transfer volume information setting switching tag storage field 91, and corresponding to the transfer volume information setting window 50: a last update date and time setting storage field 92, a volume number setting storage field 93, a volume size setting storage field 94, an emulation type setting storage field 95, an OP/MF volume setting storage field 96, a partner apparatus production number setting storage field 97, a volume priority setting storage field 98, and a volume access frequency setting storage field 99.

This transfer volume information setting storage table 90 also has check flags 100 for each of the above-listed setting storage fields 92 to 99. A check flag 100 with the number "1" displayed therein indicates that the relevant field is checked.

Moreover, the transfer volume information setting storage table 90 has a setting finalization flag 102 to indicate that the transfer volume information setting switching tag is set to "on" in accordance with the setting validation/nullification setting storage field 101 and the finalize-setting button.

Figure 6:
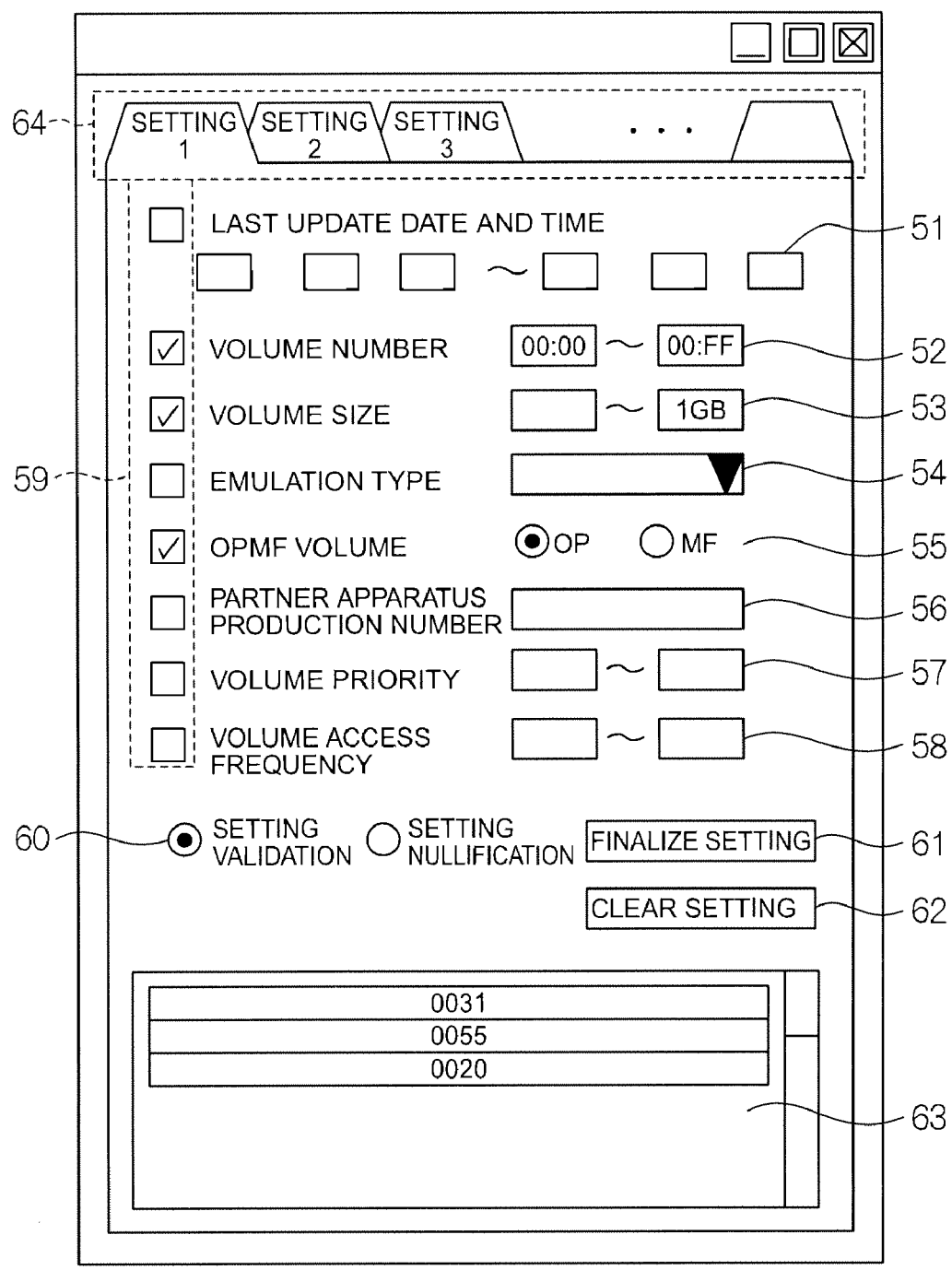
FIG. 6 is a conceptual diagram explaining a transfer volume information setting window.

When, as shown in FIG. 6, the user enters "00:00 to 04:FF" in the volume number setting field 62 and "1 GB" or less in the volume size setting field 53, selects "OP" in the OP/MF volume setting field 55, selects "setting validation" in the setting validation/nullification setting field 60, and presses the finalize-setting button 61, the CPU 21 changes the corresponding check flags 100 of the volume number setting storage field 93, the volume size setting storage field 94, and the OP/MF volume setting storage field 96 of the transfer volume information setting storage table 90 to "1," the volume number setting storage field 93 to "00:00 to 04:FF," the volume size setting storage field 94 to "1 GB" or less, the OP/MF volume setting storage field 96 to "1" (meaning "OP"), the setting validation/nullification setting storage field 101 to "1" (meaning "setting validation"), and the setting finalization flag 102 to "1" (meaning "on"). The CPU 21 then sends the changed transfer volume information setting storage table 90 to the first disk array apparatus 4.

Having received the changed transfer volume information setting storage table 90, the original channel adapter 10A updates the transfer volume information setting storage table 90 which was read into the internal memory (not shown) of the original channel adapter 10A.

Next, the original channel adapter 10A searches for an original logical volume $VOL_P$ that fits all the criteria of the changed "setting 1" of the changed transfer volume information setting storage table 90, by referring to the volume information storage table 70 which was read into the internal memory (not shown) of the original channel adapter 10A. The original channel adapter 10A then sends the volume information 41 of the found original logical volume $VOL_P$ to the console terminal 20.

Having received the relevant volume information 41 from the first disk array apparatus 4, the CPU 21 displays the volume number of the volume information 41 in the relevant logical volume display field 63.

When a user operates the operation unit 28 to select the volume number displayed in the relevant logical volume display field 63, the CPU 21 displays the volume information display window 40 shown in FIG. 4.

As described above, the storage system 1 is designed to enable the user to visually confirm, by easy operation, the volume information 41 of the original logical volume $VOL_P$ to which settings were made, using the transfer volume information setting window 50.

(1-2-3) Transfer Volume Information Registration Processing

Next, transfer volume information registration processing according to this embodiment is described below. The original channel adapter 10A, having received the write data from the host computer 2, reads a transfer standby table 110 from a specified area of the storage device and stores it in the internal memory of the original channel adapter 10A.

This transfer standby table 110 includes: a registration number storage field 111, a volume number storage field 112, a volume priority storage field 113 stored corresponding to the volume number storage field 112, and a transfer standby time storage field 114.

Having received the write date to be written to, for example, the original logical volume $VOL_P$ with volume number "00:31," the original channel adapter 10A refers to the volume information storage table 70 and searches for the volume priority of the volume number "00:31." When the original channel adapter 10A detects the volume priority of the volume number "00:31," it refers to the volume priority of the logical volume information 41 registered in the transfer standby table 110 and decides at which position the volume information 41 of the volume number "00:31" should be stored.

In this example, the original channel adapter 10A is designed to store the logical volume information 41 in order of descending volume priority. Therefore, since the volume priority of the volume number "00:31" is "70," the volume number "00:31" is stored in the volume number storage field 112 at position "3" in the registration number storage field 111, and the volume priority "70" is stored in the volume priority storage field 113. In this case, the volume numbers, the volume priorities, and the transfer standby times which were stored at positions "3" and below in the registration number storage field 111 are moved and stored at positions one row down from their respective former positions in the registration number storage field 111.

Having stored the volume information 41 in the transfer standby table 110, the original channel adapter 10A then calculates the transfer standby time of the stored volume information 41. Specifically speaking, when the original channel adapter 10A stores "00:31" in the volume number storage field 112 and "70" in the volume priority storage field 113 at position "3" in the registration number storage field 111, it calculates the transfer standby time of the volume number "00:31" based on the transfer standby times of the volume numbers "00:15" and "02:41" stored at positions "1" and "2" of the registration number storage field 111, which have higher volume priorities than the volume priority "70" of the volume number "00:31."

At this moment, the original channel adapter 10A reduces the transfer standby time stored in the transfer standby time storage field 114 of the transfer standby table 110 in accordance with measurement results from an internal timer (not shown). When the transfer standby time in the standby time storage field 114 at position "1" in the registration number storage field 111 of the transfer standby table 110 has passed, the original channel adapter 10A deletes the volume number in the volume number storage field 112, the priority in the volume priority storage field 113, and the transfer standby time in the transfer standby time. storage field 114 at position "1" of the registration number storage field 111 and moves the remaining data of the volume numbers, priorities, and transfer standby times of the respective registration number storage fields 111 up one row from their respective former positions.

When the transfer standby time stored in the transfer standby time storage field 114 at position "1" in the registration number storage field 111 of the transfer standby table 110 becomes "00:00:00," the original channel adapter 10A deletes "00:15" stored in the volume number storage field 112, "95" stored in the volume priority storage field 113, and "00:00:00" stored in the transfer standby time storage field 114 at position "1" in the registration number storage field 111 of the transfer standby table 110.

Subsequently, the original channel adapter 10A moves "02:41" stored in the volume number storage field 112, "80" stored in the volume priority storage field 113, and "00:00:03" stored in the transfer standby time storage field 114 at position "2" in the registration number storage field 111 of the transfer standby table 110 up to position "1" in the registration number storage field 111 of the transfer standby table 110. Moreover, the original channel adapter 10A moves "00:31" stored in the volume number storage field 112, "70" stored in the volume priority storage field 113, and "00:00:12" stored in the transfer standby time storage field 114 at position "3" in the registration number storage field 111 of the transfer standby table 110 up to position "2" in the registration number storage field 111 of the transfer standby table 110. Then, the original channel adapter 10A moves the following volume numbers, priorities, and transfer standby times up in the same manner.

When the volume information 41 is deleted from the transfer standby table 10, the original channel adapter 10A starts transferring the data written in the deleted volume number to the corresponding duplicate logical volume $VOL_S$ of the second disk array apparatus 5.

Figure 9:
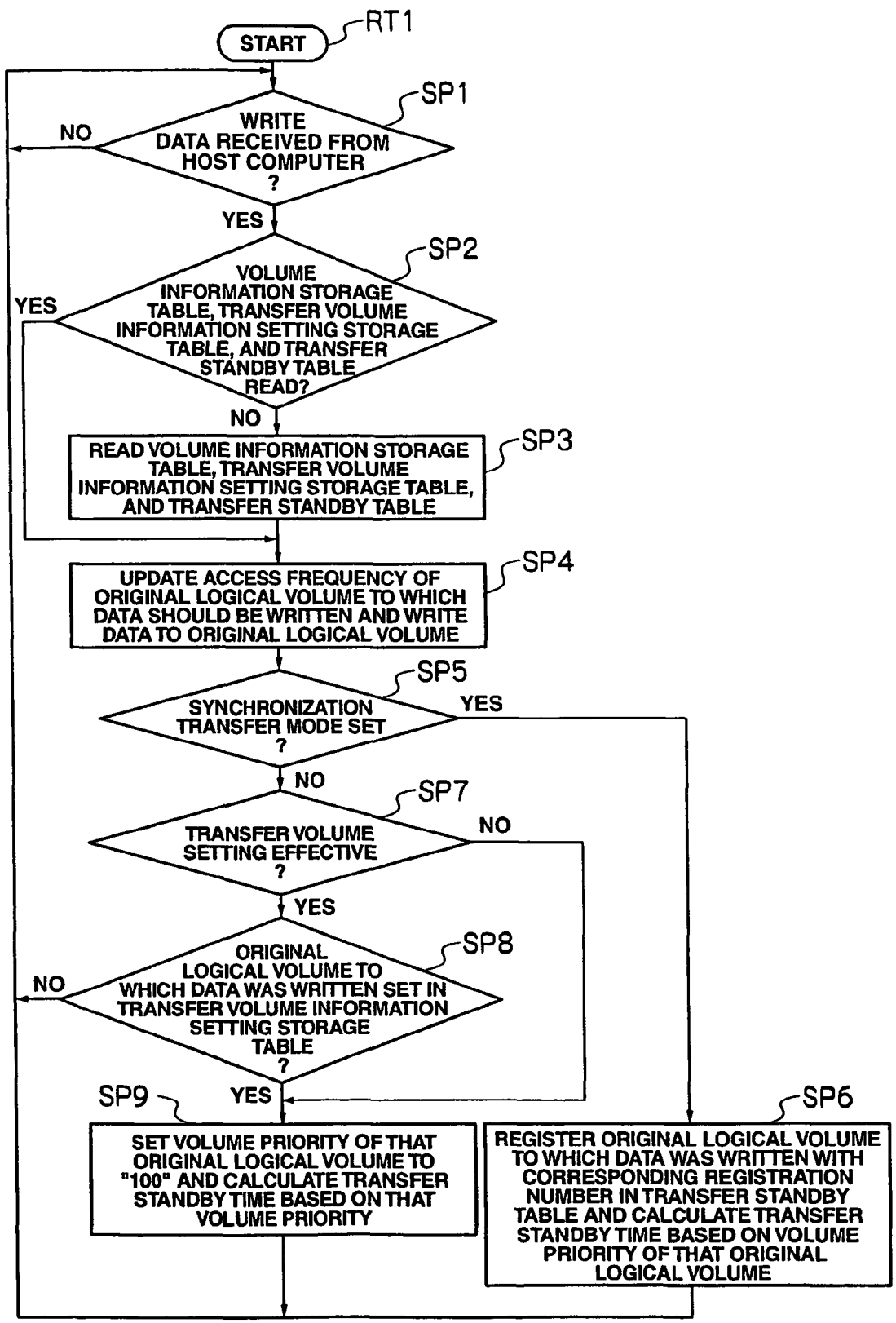
FIG. 9 is a flowchart illustrating a transfer volume information registration processing sequence.

(1-2-4) Transfer Volume Information Registration Processing Sequence and Transfer Processing Sequence Next, the transfer volume information registration processing sequence is described below. FIG. 9 is a flowchart illustrating the specific processing sequence of the transfer volume information registration processing that registers the order of the original logical volumes to which data to be transferred to the second disk apparatus 5 were written. At the beginning, the original channel adapter 10A waits for the write data to be received from the host computer 2 in accordance with the transfer volume information registration processing sequence RT1 shown in FIG. 9 (SP1).

Having received the write data from the host computer 2 (SP1: YES), the original channel adapter 10A checks whether or not the volume information storage table 70, the transfer volume information setting storage table 90, and the transfer standby table 110 have been read from a specified area of the storage device 14A and stored in the internal memory of the original channel adapter 10A (SP2).

If the volume information storage table 70, the transfer volume information setting storage table 90, and the transfer standby table 110 have not been read from the specified area of the storage device 14A and stored in the internal memory of the original channel adapter 10A (SP2: NO), the original channel adapter 10A reads the volume information storage table 70, the transfer volume information setting storage table 90, and the transfer standby table 110 from the specified area of the storage device 14A and stores them in the internal memory of the original channel adapter 10A (SP3).

On the other hand, if the volume information storage table 70, the transfer volume information setting storage table 90, and the transfer standby table 110 have been read from the specified area of the storage device 14A and stored in the internal memory of the original channel adapter 10A (SP2: YES), the original channel adapter 10A updates the number of accesses (or access frequency) in the access frequency setting storage field 79 of the original logical volume $VOL_P$ to which the write data should be written, and writes the write data to that original logical volume $VOL_P$ (SP4).

When this happens, the original channel adapter 10A increases the number of accesses by just "1" in the access frequency setting storage field 79 corresponding to the original logical volume $VOL_P$ to which the write data is written.

Subsequently, immediately after the data is written to the original logical volume $VOL_P$, the original channel adapter 10A checks whether or not the transfer mode of the first disk array apparatus 4 is set to a synchronization transfer mode to transfer the data to the corresponding duplicate logical volume $VOL_S$ of the second disk array apparatus 5 (SP5).

If the transfer mode of the first disk array apparatus 4 is set to the synchronization transfer mode (SP5: YES), the original channel adapter 10A registers the relevant logical volume information 41 of the original logical volume $VOL_P$, to which the write data was written, with the relevant registration number in the transfer standby table according to the calculated transfer standby time, sets the volume priority to "100" in the volume priority setting storage field 78 of the original logical volume $VOL_P$, and calculates, based on the volume priority, the transfer standby time required until the transfer to the corresponding duplicate logical volume $VOL_S$ of the second disk array apparatus 5 (SP6).

On the other hand, if the transfer mode of the first disk array apparatus 4 is not set to the synchronization transfer mode (SP5: NO), the original channel adapter 10A checks whether or not the setting finalization flag 102 in the transfer volume information setting storage table 90 is set to "on" (SP7).

If the setting finalization flag 102 in the transfer volume information setting storage table 90 is set to "on" (SP7: YES), the original channel adapter 10A checks whether or not the volume information 41 of the original logical volume $VOL_P$ to which the write data was written has been set in the transfer volume information setting storage table 90 (SP8).

If the volume information 41 of the original logical volume $VOL_P$ to which the write data was written has not been set in the transfer volume information setting storage table 90 (SP8: NO), the original channel adapter 10A returns to standby mode to wait for write data from the host computer 2 again (SP1).

On the other hand, if the setting finalization flag 102 in the transfer volume information setting storage table 90 is not set to "on" (SP7: NO), or if the volume information 41 of the original logical volume $VOL_P$ to which the write data was written has been set in the transfer volume information setting storage table 90 (SP8: YES), the original channel adapter 10A registers the relevant logical volume information 41 of the original logical volume $VOL_P$, to which the write data was written, with the relevant registration number in the transfer standby table according to the calculated transfer standby time, and calculates, based on the volume priority of the original logical volume $VOL_P$ in the volume priority setting storage field 78, the transfer standby time required until the transfer to the corresponding duplicate logical volume $VOL_S$ of the second disk array apparatus 5 (SP9).

Subsequently, the original channel adapter 10A returns to standby mode to receive write data from the host computer 2 again (SP1) and then repeats the same processing thereafter (from SP1 to SP9 and back to SP1).

Figure 10:
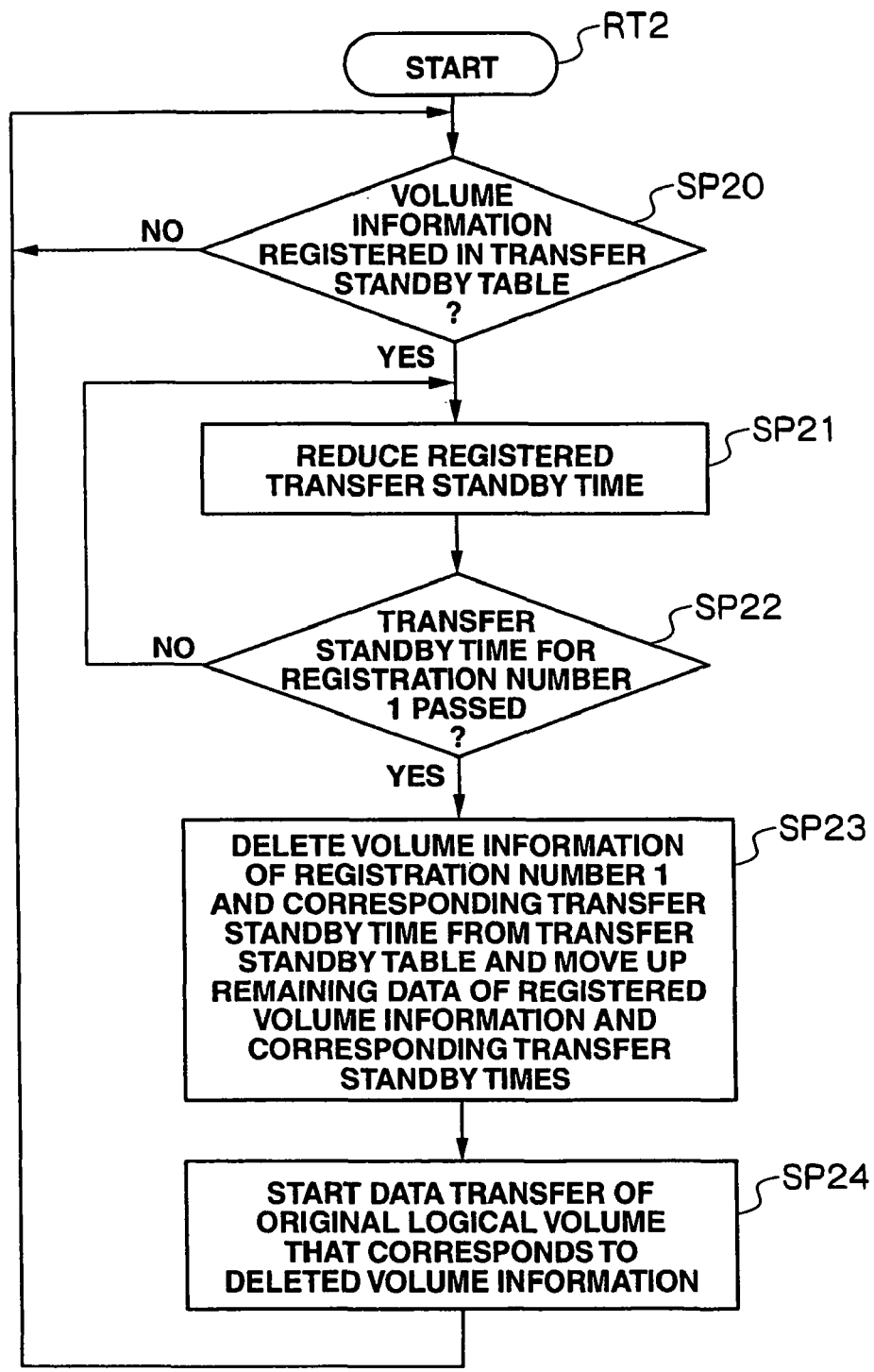
FIG. 10 is a flowchart illustrating a transfer processing sequence.

Next, the transfer processing sequence is described below. FIG. 10 is a flowchart illustrating the specific transfer processing sequence to transfer data to the second disk array apparatus 5 based on the volume information 41 registered in the transfer standby table 110. At the beginning, the original channel adapter 10A checks whether or not the volume information 41 has been registered in the transfer standby table 110 in accordance with the transfer processing sequence RT2 shown in FIG. 10 (SP20).

If the volume information 41 is not registered in the transfer standby table 110 (SP20: NO), the original channel adapter 10A waits in standby mode for the volume information 41 to be registered in the transfer standby table 110. On the other hand, if the volume information 41 is registered in the transfer standby table 110 (SP20: YES), the original channel adapter 10A reduces the transfer standby time registered in the transfer standby time storage field 114 of the transfer standby table 110 by a specified amount of time (SP21).

Then, the original channel adapter 10A checks whether or not the transfer standby time for registration number "1" in the registration number storage field 111 of the transfer standby table 110 has passed (SP22). If the transfer standby time for registration number "1" in the registration number storage field 111 of the transfer standby table 110 has not passed (SP22: NO), the original channel adapter 10A reduces the transfer standby time registered in the transfer standby time storage field 114 of the transfer standby table 110 by a specified amount of time (SP21).

On the other hand, if the transfer standby time for registration number "1" in the registration number storage field 111 of the transfer standby table 110 has passed (SP22: YES), the original channel adapter 10A deletes the volume information 41 and its corresponding transfer standby time for registration number "1" in the registration number storage field 111 of the transfer standby table 110, and moves the remaining data of the registered volume information 41 and the corresponding transfer standby times registered in the transfer standby table 110 to positions respectively one row up (SP23).

The original channel adapter 16A then starts the data transfer from the original logical volume $VOL_P$ that corresponds to the deleted volume information 41 of registration number "1" in the registration number storage field 111 of the transfer standby table 110 (SP24). Subsequently, the original channel adapter 10A checks again whether or not any volume information 41 is registered in the transfer standby table 110 (SP20) and then repeats the same processing thereafter (from SP20 to SP24 and back to SP20).

(1-2-5) Volume Priority Automatic Change Processing

Volume priority automatic change processing according to this embodiment is described below. The original channel adapter 10A counts the number of accesses in the access frequency storage field 79 of the volume information storage table 70, checks the number of accesses at certain intervals, and increases the volume priority for volumes with a large number of accesses or decreases the volume priority for volumes with a small number of accesses.

Figure 11:
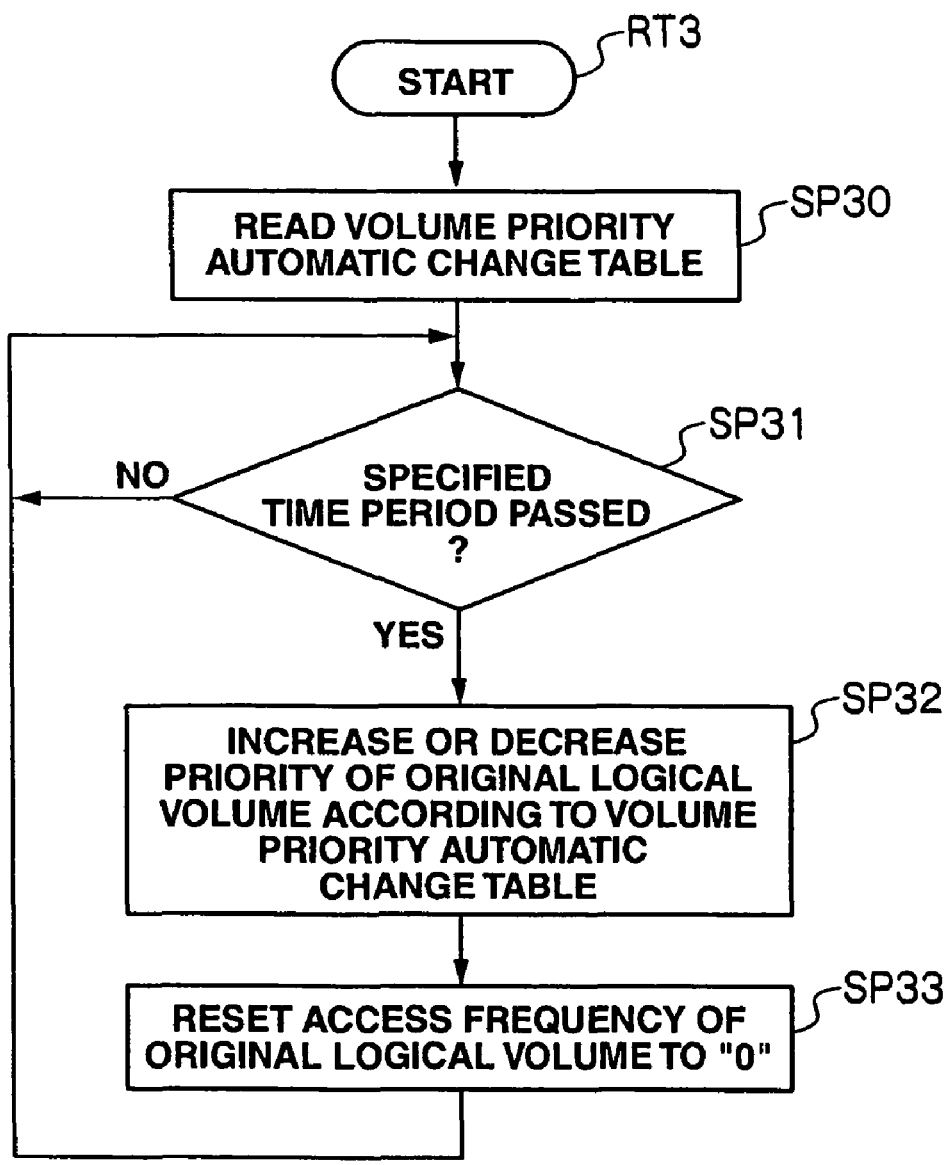
FIG. 11 is a flowchart illustrating a volume priority automatic change processing sequence.

FIG. 11 is a flowchart illustrating the specific processing sequence of the volume priority automatic change processing. At the beginning, the original channel adapter 10A reads a volume priority automatic change table 120 from a specified area of the storage device 14A and stores it in the internal memory of the original channel adapter 10A (SP30).

The original channel adapter 10A then waits in standby mode for a specified amount of time to pass (SP31). If the specified amount of time has passed (SP31: YES), the original channel adapter 10A checks the access frequency storage field 79 of every original logical volume $VOL_P$ in the volume information storage table 70 and increases or decreases the volume priority in the volume priority storage field 79 of the volume information storage table 70 in accordance with the volume priority automatic change table 120 stored in the internal memory of the original channel adapter 10A (SP32).

This volume priority automatic change table 120 shows the increase/decrease in the volume priority based on the number of accesses (or access frequency). For example, if the number of accesses is "0," the volume priority adjustment is "−3." If the number of accesses is "5" or less, the volume priority adjustment is "−1." If the number of accesses is "10" or less, the volume priority adjustment is "±0." If the number of accesses is "15" or less, the volume priority adjustment is "+1." If the number of accesses is "20" or less, the volume priority adjustment is "+3." If the number of accesses is more than "20," the volume priority adjustment is "+5."

When the specified amount of time has passed, since the number of accesses is "20" for the volume number "00:31" in the volume information storage table 70 shown in FIG. 5, the original channel adapter 10A increases the priority from "70" to "73." Regarding the volume number "00:02," its number of accesses is "0" and, therefore, the original channel adapter 10A decreases the priority from "20" to "17." Moreover, regarding the volume number "00:00," its number of accesses is "9" and, therefore, the original channel adapter 10A keeps the priority at "60," without any change.

The original channel adapter 10A then resets all the numbers of accesses stored in the access frequency storage field 79 of the volume information storage table 70 to "0" (SP33). Subsequently, the original channel adapter 10A returns to standby mode to wait for a specified amount of time to pass (SP31) and then repeats the same processing thereafter (from SP31 to SP33 and then back to SP31).

In the storage system 1 as described above, the volume priority is set by a user for each original logical volume $VOL_P$ of the first disk array apparatus 4, and the data written to the original logical volumes $VOL_P$ are transferred to their corresponding duplicate logical volumes $VOL_S$ of the second disk array apparatus 5 in order of descending priority of the original logical volumes $VOL_P$ which store the data. Accordingly, regardless of the order in which the data were written to the logical volumes, data written to the original logical volume $VOL_P$ with a high volume priority can be transferred first. As a result, for the backup of important data as well, data can be transferred to the corresponding duplicate logical volume $VOL_S$ of the second disk array apparatus 5 without being left until later.

Moreover, in the storage system 1, a user can set the original logical volume $VOL_P$ from which data should be transferred to the second disk array apparatus 5, and transfer only the data written to that original logical volume $VOL_P$ to the corresponding duplicate logical volume $VOL_S$ of the second disk array apparatus 5. Since not all the data in the first disk array apparatus, but only the data of the original logical volume $VOL_P$, to which settings were made by the user, can be transferred, it is possible to minimize the data transfer amount and reduce copying time.

Moreover, in the storage system 1, the number of accesses in the access frequency storage field 79 of the volume information storage table 70 is counted and checked at predetermined intervals, and the volume priority is increased for a volume with a large number of accesses and decreased for a volume with a small number of accesses. Therefore, the volume priority of the original logical volume $VOL_P$ with a large number of accesses can be increased without requiring a user to set the volume priority.

This embodiment describes the case where the volume priority is set for each original logical volume $VOL_P$. However, this invention is not limited to just that setting, and the priority may be set for each piece of data written to the original logical volume $VOL_P$.

Moreover, this embodiment describes the case where the data written in the original logical volume $VOL_P$ of the first disk array apparatus 4 is transferred via the signal line 16 to the corresponding duplicate logical volume $VOL_S$ of the second disk array apparatus 5. However, this invention is not limited to just that configuration, and data can be transferred via the network 3 to another first disk apparatus 4, and this invention can be applied to various other system forms.

This embodiment also describes the case where the volume information display window 40 and the transfer volume information setting window 50 are configured as shown in FIGS. 4 and 6. However, this invention is not limited to just those configurations, and can be applied to various other system forms.

This embodiment also describes the case where the volume information storage table 70, the transfer volume information setting storage table 90, the transfer standby table 110, and the volume priority automatic change table 114 are configured as shown in FIGS. 5, 7, 8 and 12. However, this invention is not limited to just those configurations, and can be applied to various other system forms.

Moreover, this embodiment describes the case where data written to the original logical volumes $VOL_P$ are transferred to their corresponding duplicate logical volumes $VOL_S$ of the second disk array apparatus 5 in order of descending priority of the original logical volumes $VOL_P$ to which the data were written. However, this invention is not limited to just that configuration, and data may be transferred to the corresponding duplicate logical volumes $VOL_S$ of the second disk array apparatus 5 at the request of a duplicate channel adapter 10B of the second disk array apparatus 5.

This embodiment further describes the case where the processing sequences are executed by hardware having functions for the relevant processing. However, this invention is not limited to just that case, and the processing sequences may be executed by software. In order to use software to perform the processing, various kinds of programs need to be installed on a computer in which the program constituting the software to perform the processing is incorporated into special-purpose hardware, thereby enabling the execution of various functions. The various kinds of programs are installed from, for example, recording media. Examples of the recording media obviously include optical disks, magneto-optical disks, semiconductor memory, and magnetic disks. Various programs may also be installed by downloading them via a network such as the Internet.

The present invention can be widely applied to various forms of storage systems.

What is claimed is:

1. A storage system comprising:
    a first disk array apparatus configured with first storage areas for storing data sent from a host system;
    a second disk array apparatus configured with second storage areas for storing back-up data of the first storage areas; and
    a console terminal which operates the first disk array apparatus,
    wherein the console terminal includes a setting unit for setting a priority for each first storage area in accordance with an external command with decreasing the priority when the number of times accessed to the each first storage area is within a first predetermined range, not changing the priority when the number is within a second predetermined range, and increasing the priority when the number is within a third predetermined range,
    wherein the first disk array apparatus includes:
    a storage unit for storing the priorities set by the priority setting unit; and
    a transfer unit for reading the priorities from the storage unit upon receiving the data, and transferring the data stored in the first storage areas to the second storage areas of the second disk array apparatus in a descending order according to the priorities of the first storage areas that store the data, and
    wherein the first disk array apparatus includes a counting unit for counting the number of times data is received for each first storage area.

2. A data transfer method for a storage system including a first disk array apparatus configured with first storage areas for storing data sent from a host system, a second disk array apparatus configured with second storage areas for storing back-up data of the first storage areas, and a console terminal which operates the first disk array apparatus, the method comprising:
    a first step of setting a priority for each first storage area in accordance with an external command with decreasing the priority when the number of times accessed to the each first storage area is within a first predetermined range, not changing the priority when the number is within a second predetermined range, and increasing the priority when the number is within a third predetermined range;
    a second step of storing, in a storage unit, the priorities set in the first step; and
    a third step of reading the priorities from the storage unit upon receiving the data, and transferring the data stored in the first storage areas to the second storage areas of the second disk array apparatus in a descending order according to the priorities of the first storage areas that store the data.

3. A computer readable storage medium storing a software program, said program for transferring data in a storage system including a first disk array apparatus configured with first storage areas for storing data sent from a host system, a second disk array apparatus configured with second storage areas for storing back-up data of the first storage areas, and a console terminal which operates the first disk array apparatus, said program, when executed by a computer, performing a process comprising:
    storing, in a storage unit, a priority set for each first storage area in accordance with an external command with decreasing the priority when the number of times accessed to the each first storage area is within a first predetermined range, not changing the priority when the number is within a second predetermined range, and increasing the priority when the number is within a third predetermined range; and
    reading the priorities from the storage unit upon receiving the data, and transferring the data stored in the first storage areas to the second storage areas of the second disk array apparatus in a descending order according to the priorities of the first storage areas that store the data.

* * * * *